United States Patent
Liu et al.

(10) Patent No.: US 9,117,259 B2
(45) Date of Patent: Aug. 25, 2015

(54) METHOD AND SYSTEM FOR LIVER LESION DETECTION

(75) Inventors: David Liu, Princeton, NJ (US); Dijia Wu, North Brunswick, NJ (US); Shaohua Kevin Zhou, Plainsboro, NJ (US); Maria Jimena Costa, Nuremberg (DE); Michael Suehling, Erlangen (DE); Christian Tietjen, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 995 days.

(21) Appl. No.: 13/238,370

(22) Filed: Sep. 21, 2011

(65) Prior Publication Data
US 2012/0070055 A1    Mar. 22, 2012

Related U.S. Application Data

(60) Provisional application No. 61/385,221, filed on Sep. 22, 2010.

(51) Int. Cl.
*G06K 9/00* (2006.01)
*G06T 7/00* (2006.01)
*G06T 7/40* (2006.01)

(52) U.S. Cl.
CPC .............. *G06T 7/0016* (2013.01); *G06T 7/401* (2013.01); *G06T 2207/10072* (2013.01); *G06T 2207/20012* (2013.01); *G06T 2207/20041* (2013.01); *G06T 2207/20081* (2013.01); *G06T 2207/20104* (2013.01); *G06T 2207/30056* (2013.01)

(58) Field of Classification Search
USPC .................................................. 382/128–132
See application file for complete search history.

(56) References Cited

U.S. PATENT DOCUMENTS

| | | | |
|---|---|---|---|
| 7,088,850 B2 * | 8/2006 | Wei et al. | 382/128 |
| 2008/0044080 A1 | 2/2008 | Li | |
| 2008/0107323 A1 * | 5/2008 | Ratner et al. | 382/132 |
| 2009/0097726 A1 | 4/2009 | Rusko et al. | |
| 2009/0124907 A1 | 5/2009 | Bruce et al. | |
| 2010/0080434 A1 | 4/2010 | Seifert et al. | |
| 2010/0266170 A1 | 10/2010 | Khamene et al. | |
| 2011/0002520 A1 | 1/2011 | Suehling et al. | |
| 2011/0317888 A1 * | 12/2011 | Simon | 382/128 |

FOREIGN PATENT DOCUMENTS

WO    2005/106773 A2    11/2005

OTHER PUBLICATIONS

Barbu et al., "Automatic Detection and Segmentation of Axillary Lymph Nodes", Sep. 20, 2010, Medical Image Computing and Computer-Assisted Intervention, pp. 28-36.

(Continued)

*Primary Examiner* — Wesley Tucker

(57) ABSTRACT

A method and system for automatically detecting liver lesions in medical image data, such as 3D CT images, is disclosed. A liver region is segmented in a 3D image. Liver lesion center candidates are detected in the segmented liver region. Lesion candidates are segmented corresponding to the liver lesion center candidates, and lesions are detected from the segmented lesion candidates using learning based verification.

31 Claims, 13 Drawing Sheets

(56) References Cited

OTHER PUBLICATIONS

Militzer et al., "Automatic Detection and Segmentation of Focal Liver Lesions in Contrast Enhanced CT Images", Pattern Recognition, 2010 20th International Conference on, IEEE, Piscataway, NJ, Aug. 23, 2010, pp. 2524-2527.

Hardie et al., "Performance Analysis of a New Computer Aided Detection System for Identifying Lung Nodles on Chest Radiographs", Medical Image Analysis, Oxford University Press, Oxford, GB, vol. 12, No. 3, Jun. 1, 2008, pp. 240-258.

International Search Report dated Jan. 31, 2012.

Ling, et al., "Hierarchical Learning-based Automatic Liver Segmentation", IEEE Conf. Computer Vision and Pattern Recognition (CVPR), 2008.

Frangi et al., "Multiscale Vessel Enhancement Filtering", vol. 1496/1998, 130, MICCAI 1998.

* cited by examiner

FIG. 9B

Algorithm 1 Gradient based locally adaptive segmentation method.

Input: Liver volume $I(x, y, z)$ and number of thresholds $n$.
Output: Threshold $\Omega(x, y, z)$, binary segmentation $S(x, y, z) = 1$ if $I(x, y, z) < \Omega(x, y, z)$ and 0 otherwise.

952 → 1. Run liver intensity histogram analysis and obtain the peak intensity value $\tau$ and standard deviation $\sigma$. Set $\tau_{min} = \tau - n\sigma, \tau_{max} = \tau$ and $\Delta\tau = \sigma$.
954 → 2. Start from single threshold $\omega = \tau_{max}$ and obtain initial binary segmentation $S$.
956 → 3. Run 3D connected component labeling on $S$. Each connected component is denoted as $C_i$ and its surface as $R_i$.
958 → 4. Calculate the mean surface gradient norm of $C_i$: $G_i = \Sigma_{(x,y,z)\in R_i}|\nabla I(x,y,z)|/|R_i|$.
960 → 5. For $C_i$, use threshold $\omega' = \omega - \Delta\tau$ to obtain new segmentation and connected
962 → components $C_i'$, $R_i'$ and $G_i'$.
6. $\Omega(x, y, z) = \omega$ if $G_i \geq G_i'$ and $\omega'$ otherwise. $\forall (x, y, z) \in C_i$, then update $S$.
964 → 7. Set $\omega = \omega'$ and $\omega' = \omega' - \Delta\tau$ and repeat step 3 to 7 until $\omega = \tau_{min}$.

FIG. 10

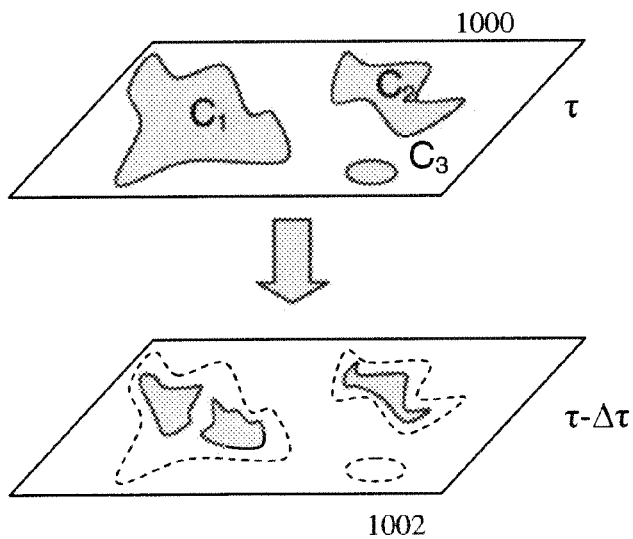

1200  1202

1210  1212

1300

METHOD AND SYSTEM FOR LIVER LESION DETECTION

This application claims the benefit of U.S. Provisional Application No. 61/385,221, filed Sep. 22, 2010, the disclosure of which is herein incorporated by reference.

BACKGROUND OF THE INVENTION

The present invention relates to detection of liver lesions, and more particularly, to database-guided liver lesion detection and segmentation in medical images.

Detection of abnormal hepatic masses is important to liver disease diagnosis, treatment planning and follow-up monitoring. As a significant part of clinical practice in radiology, liver tumors are usually examined and tracked every several weeks or months to assess the cancer staging and therapy response based on 3D Computed Tomography (CT) data. However, manually finding these lesions is tedious, time consuming, and highly dependent on the observer's experiences. Hence, a system of automatic lesion detection and measurement is desirable.

BRIEF SUMMARY OF THE INVENTION

The present invention provides a method and system for automatically detecting and segmenting liver lesions. In particular, embodiments of the present invention utilize a robust and effective learning based method for automatic detection of liver lesions from computed tomography (CT) data. Embodiments of the present invention can automatically detect hypodense and hyperdense lesions from a single 3D CT image of any contrast phase.

In one embodiment of the present invention, liver lesion center candidates are detected in a 3D medical image. A lesion candidate corresponding to each liver lesion center candidate is segmented. Lesions are detected from the segmented lesion candidates using learning based verification.

These and other advantages of the invention will be apparent to those of ordinary skill in the art by reference to the following detailed description and the accompanying drawings.

BRIEF DESCRIPTION OF THE DRAWINGS

FIG. 9B illustrates pseudo-code for implementing the method of FIG. 9A;

FIG. 10 illustrates exemplary segmentation using two neighboring thresholds;

DETAILED DESCRIPTION

Figure 1:
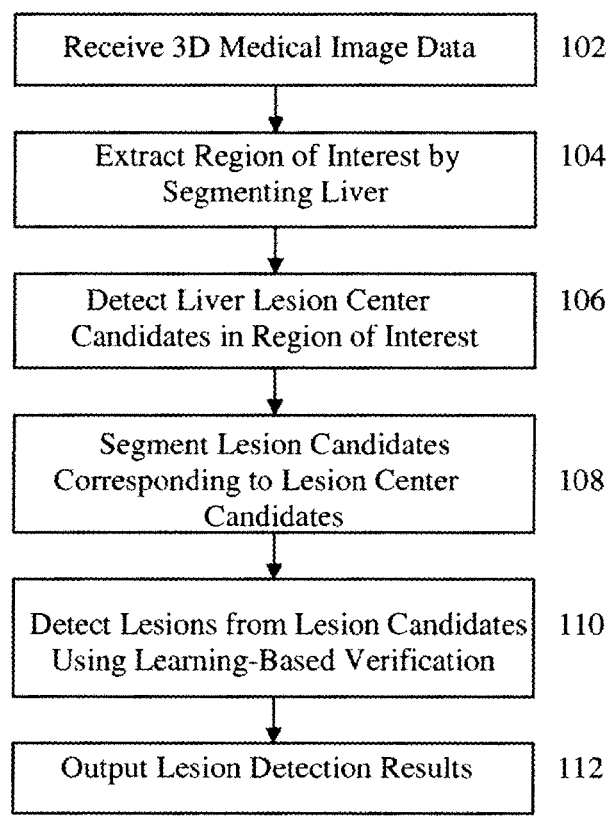
FIG. 1 illustrates a method of automatic liver lesion detection according to an embodiment of the present invention.

The present invention is directed to a method and system for automatically detecting liver lesions in medical image data. Embodiments of the present invention are described herein to give a visual understanding of the liver lesion detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Tumor staging and follow-up examinations account for a large part of routine work in radiology. Cancer patients regularly undergo a computed tomography (CT) examination in intervals of several weeks or months to monitor the patient status or to assess therapy response. It is also possible that such an examination is performed using other imaging modalities, such as positron emission tomography (PET)/CT or magnetic resonance imaging (MRI). A radiologist typically manually checks whether the tumors have changed in size, position and form and whether there are new lesions. Currently, clinical practice shows a number of limitations. According to current clinical guidelines such as RECIST or WHO, only the size of a few selected target lesions is tracked and reported over time. New lesions need to be mentioned but not reported in size. The restriction to only consider a subset of target lesions is mainly due to the fact that manual assessment and size measurement of all lesions is very time consuming, especially if the patient has many lesions. Also, lesion size is typically only measured in the form of one or two diameters of a lesion. Currently, there are some available algorithms for lesion segmentation that provide volumetric size measurements. However, when started manually, a user typically has to wait several seconds for such algorithms to run on each lesion. This makes routine use of such segmentation algorithms impracticable. Furthermore, in the clinical routine, lesions may be overlooked, especially when the radiologist lacks experience or time.

Embodiments of the present invention provide a method for automated detection of liver lesions from 3D medical image data, such as CT data or MR data. The automatic lesion detection described herein allows all lesions in the body to be quantitatively assessed, since lesion segmentation algorithms can be triggered and run automatically during a fully-automatic pre-processing step before the data is actually read by a user. This saves time and in also yields the total tumor burden (diameter or volume) and not just the burden of some selected target lesions. The detected lesions and associated segmentations allow for an easy navigation through the lesions according to different criteria, such as lesion size (the biggest lesions are typically of highest interest), lesion location (e.g., left or right liver lobe, etc.), or appearance (e.g., necrotic, calcifications, etc.). Automatic detection also reduces the dependency of reading results on the user and allows a fully automatic comparison of follow up data to highlight changes such as new/disappeared lesions.

The automated lesion detection method described herein is mainly intended to detect frequent lesion types such as hypodense (dark) and hyperdense (bright) lesions. However, the method may also be applied to more inhomogeneous lesions that occur less frequently. The automated lesion detection method first detects candidate lesion centers using a learning-based approach. Each candidate center then provides single or multiple candidate lesion boundaries. A learning-based verification stage uses features obtained from the data and the extracted boundaries to score the candidates and detect the best candidates as lesions.

FIG. 1 illustrates a method of automatic liver lesion detection according to an embodiment of the present invention. As illustrated in FIG. 1, at step 102, 3D medical image data is received. The 3D image data may be CT data, but the present invention is not limited thereto. The 3D image data may also be MR data or hybrid image data, such as PET/CT image data. The medical image data may be received directly from an image acquisition device, such as a CT scanner, or may be received by loading previously acquired medical image data from a memory or storage of a computer system.

At step 104, a region of interest is extracted by segmenting the liver in the 3D medical image. In particular, in order to constrain the search for the liver lesions a liver region can be segmented and the 3D volume cropped to a region interest corresponding to voxels in the segmented liver region. The liver region of interest (subvolume) may be resampled, for example to a 1.5 mm isotropic resolution. The liver may be segmented using the liver segmentation method described in Ling, et al., "Hierarchical Learning-based Automatic Liver Segmentation", *IEEE Conf. Computer Vision and Pattern Recognition* (CVPR), 2008, which is incorporated herein by reference.

Figure 2:
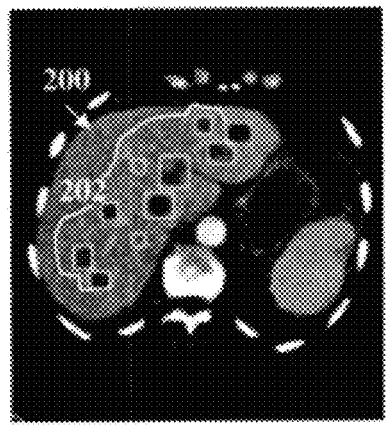
FIG. 2 illustrates an exemplary CT image showing annotated liver lesions.

At step 106, lesion center candidates are detected in the region of interest. The lesion center candidates are detected from the voxels in the region of interest using on or more lesion center detectors trained from a set of annotated training data. In one possible implementation, in order to train the lesion center detectors, each liver lesion of size at least 10 mm in a set of training volumes is annotated by placing a bounding box around it. FIG. 2 illustrates an exemplary CT image showing annotated liver lesions. As shown in FIG. 2, bounding boxes 202 representing the liver lesions are shown within a segmented liver region 200. The voxels within a predefined distance from the bounding box centers are used as positive samples and voxels outside of the bounding boxes are used as negative samples in training. The lesions are labeled as hypodense (darker) or hyperdense (brighter) depending on the difference of enhancement pattern between normal liver parenchyma and lesions.

Figure 3:
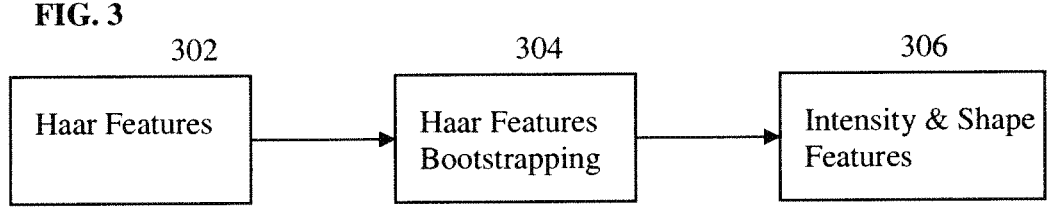
FIG. 3 illustrates and example of a multi-stage liver lesion center detector according to an embodiment of the present invention.

A trained liver lesion center detector may detect liver lesion center candidates in multiple stages using separate trained detectors at each stage. FIG. 3 illustrates and example of a multi-stage liver lesion center detector according to an embodiment of the present invention. As illustrated in FIG. 3, the multi-stage liver lesion center detector performs three detection stages 302, 304, and 306, with a separate detector/classifier trained for each stage 302, 304, and 306. The detector for each stage 302, 304, and 306 can be trained as a probabilistic boosting tree (PBT) based on the annotated training data. Voxels classified as negative at each stage 302, 304, and 306 are discarded.

The first detection stage 302 utilizes a trained detector to detect an initial set of lesion center candidates based on Haar features. In an exemplary implementation, the first detection stage 302 uses fast Haar-based detector that is a cascade of two PBT classifiers. In the exemplary implementation, the first classifier has 100 weak learners and the second has 200. The PBT classifiers are trained using 138,464 3D Haar features with all positive voxels uses as the positive training samples, and the negative training samples generated by randomly sampling one percent of the negative voxels in the training data. It is also possible that a single Haar-based classifier be used at this stage. Voxels classified as positive in stage 302 are propagated to stage 304.

The second detection stage 304 utilizes a second Haar detector that is trained for bootstrapping. That is, the second Haar detector used in stage 304 is trained using the same set of features and classifier configuration as the detector in the previous stage 302, but with all positive and negative training samples having been classified as positive in the first stage 302. Voxels classified as positive in stage 304 are propagated to stage 306.

The third detection stage 306 utilizes a detector trained to detector lesion center candidates based on intensity and shape features extracted for each candidate voxel. This detector extracts features at positions with a high gradient. Rays are cast in 14 directions from a candidate voxel. In each direction, local maxima of the grayscale intensity gradient above one of 10 thresholds are found at three scales. At each local maximum, steerable features are calculated. In addition, steerable features are also computed at half way between the candidate position and each local maximum. Also, the distance to each local maximum is also used as features. Voxels classified as positives in stage 306 are selected as lesion center candidates.

Although FIG. 3 provides an exemplary structure for a lesion center candidate detector, the present invention is not limited to the structure of FIG. 3. For example, in an alternative implementation, the detector may only utilizes the first two stages and not utilize a third detection stage based on shape and intensity features.

In order to detect hypodense and hyperdense lesions using the same detector, it is possible to invert image intensities in the segmented region of interest, which results in flipping the dark and light intensities. In particular, the inverted intensities can be defined as $I_v=2*\mu_L-1$, where I denotes the original image intensity and $\mu_L$ denotes the means intensity value within the segmented liver region. This makes bright lesions appear dark, so as to be segmented by the same detector that detects the dark regions. According to a possible implementation, the received image data can be processed twice, once using the original image intensities and once using the inverted intensities, in order to detect both hypodense and hyperdense lesions.

In CT and MR imaging, intravenous contrast agents (e.g., iodine compounds in CT or gadolinium-based in MR) are routinely used to highlight specific areas so that organs (liver tissue), blood vessels, or lesions are more visible in the acquired images. Once the contrast is injected into the bloodstream, it circulates throughout the body. In CT, the x-ray beam is weakened as it passes through the blood vessels and organs that have "taken up" the contrast. Structures and lesions are enhanced by this process and show up bright on the images. This is similar in MR, as well. The kidneys and liver quickly eliminate the contrast from the body. For routine abdominal scans, different phases of image acquisition can be distinguished dependent on the time delay after starting contrast agent injection. The native phase corresponds to an image acquired before contrast agent injection. The native phase allows calcified areas to be identified that may be not be distinguishable from contrast agent in other phases. The arterial phase corresponds to an image acquired approximately 10-20 seconds after contrast agent injection. In this phase, hyperdense lesions are most visible since hyperdense lesions quickly take up contrast bolus. The portal venous phase corresponds to a scan delay of 60-70 seconds. In this phase, hypodense lesions are most visible since they do not take up much contrast agent and remain dark, whereas the surrounding normal liver tissue is enhanced to its maximum contrast.

The contrast phase may be automatically detected in the received 3D medical image using the method described in United States Published Patent Application No. 2011/0002520, which is incorporated herein by reference. The detection of the lesion center candidates can be based on the detected contrast phase of the image. For example, a separate lesion center detector may be trained for each contrast phase, and the appropriate detector selected based on the detected contrast phase of the received 3D medical image. Another possible implementation is described below with reference to FIG. 4.

Figure 4:
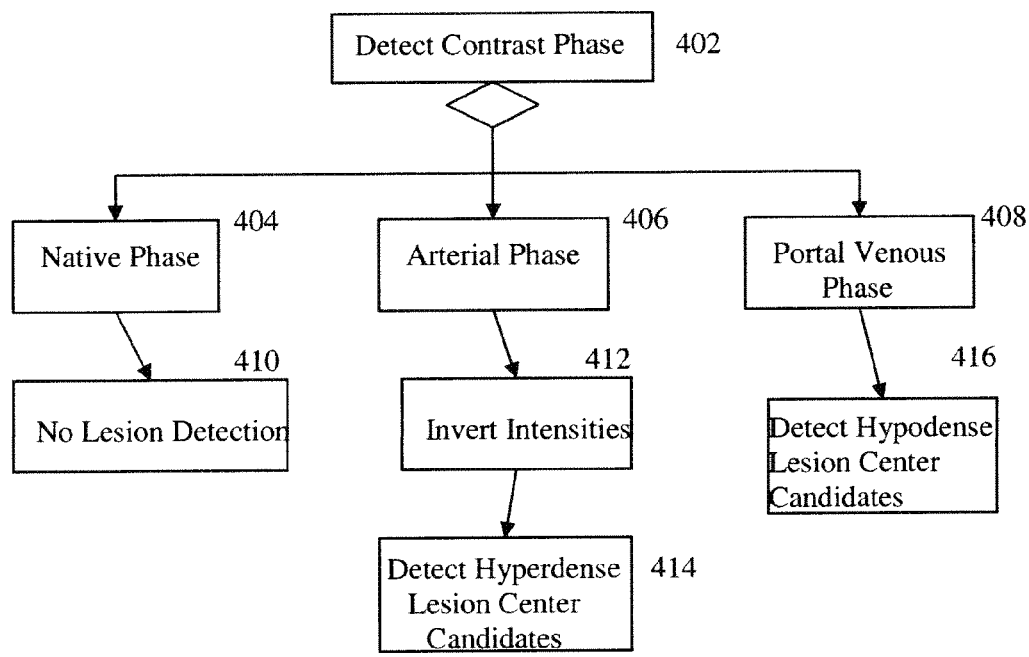
FIG. 4 illustrates a method for detecting lesion center candidates based on the contrast phase of a 3D medical image according to an embodiment of the present invention.

FIG. 4 illustrates a method for detecting lesion center candidates based on the contrast phase of a 3D medical image according to an embodiment of the present invention. At step 402, the contrast phase is automatically detected in the 3D image. This results in a determination of native phase 404, aterial phase 406, or portal venous phase 408. If it is determined that the contrast phase is the native phase 404, the method proceeds to step 410, if it is determined that the contrast phase is the aterial phase 406, the method proceeds to step 412, and if it is determined that the contrast phase is the portal venous phase 408, the method proceeds to step 416. At step 410, if the image is in the native phase, no lesion detection is performed on the native data. At step 412, if the image is in the arterial phase, the intensities within the region of interest are inverted, and at step 414, hyperdense lesion center candidates are detected from the inverted data using the trained lesion center candidate detector. At step 416, if the image is in the portal venous phase, hypodense lesion center candidates are detected in the region of interest using the trained lesion center candidate detector.

Returning to FIG. 1, at step 108, lesion candidates are segmented corresponding to the detected lesion center candidates. In particular, one or more lesion candidate is segmented for each detected lesion center candidate.

Figure 5:
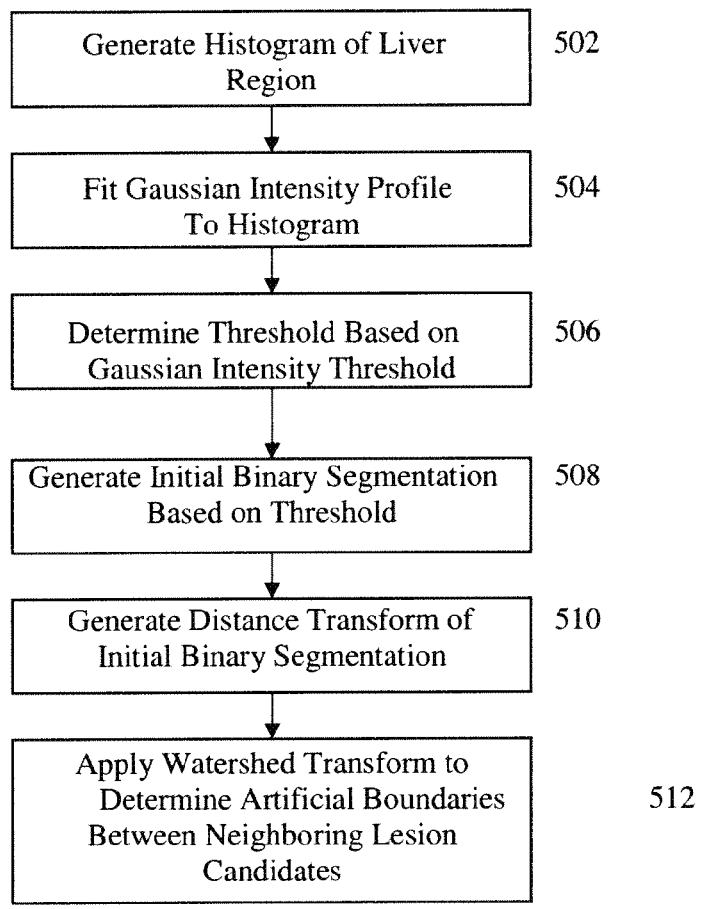
FIG. 5 illustrates a method for segmenting lesion candidates using Adaptive Thresholding Watershed Identification (ATWI) according to an embodiment of the present invention.
Figure 6:
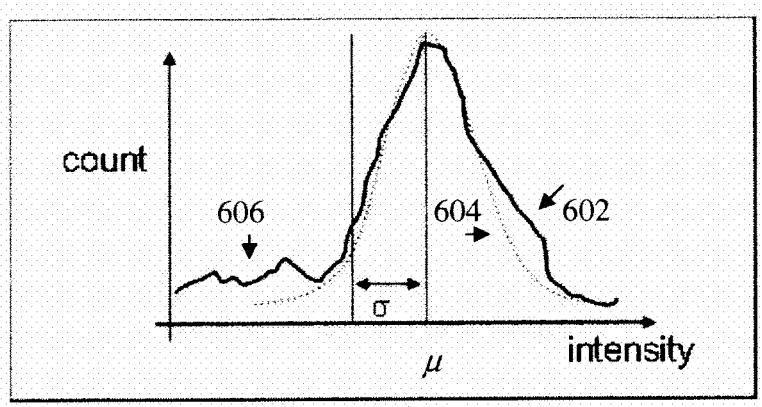
FIG. 6 illustrates an exemplary histogram and Gaussian intensity profile used for adaptive thresholding.

FIG. 5 illustrates a method for segmenting lesion candidates using Adaptive Thresholding Watershed Identification (ATWI) according to an embodiment of the present invention. The method of FIG. 5 may be used to implement step 108 of FIG. 1. As illustrated in FIG. 5, at step 502, a histogram of the segmented liver region is generated. The peak intensity value in the histogram of the liver region can be determined. FIG. 6 illustrates an exemplary histogram and Gaussian intensity profile used for adaptive thresholding. As shown in FIG. 6, histogram 602 is a histogram of a segmented liver region.

At step 504, a Gaussian intensity profile is fit to the main histogram mode of segmented liver region. The Gaussian intensity profile is fit to the main histogram mode, not including other modes that may be due to intensity values of the lesions. As shown in FIG. 6, a Gaussian intensity profile 604 is fit to the main histogram mode of histogram 602, which does not include a portion 606 of the histogram that corresponds to intensities likely due to the intensity values of the lesions. This attempts to model the intensity distribution of the "normal" or non-lesion liver tissue.

Figure 7:
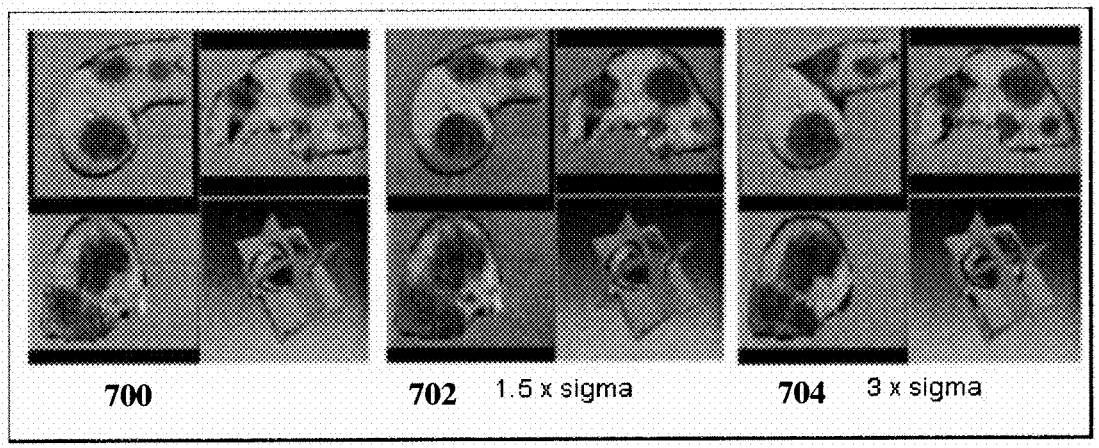
FIG. 7 illustrates exemplary initial segmentation results using adaptive thresholding.

At step 506, a threshold is determined based on the Gaussian intensity profile. In particular, the mean $\mu$ and standard deviation a of the Gaussian intensity profile are extracted and the threshold is determined based on the mean and standard deviation of the fitted Gaussian model. The threshold can be calculated as $\tau=\mu-n*\sigma$, where n is a preset constant. In one implementation n=1.5, but the present invention is not limited thereto. In another possible implementation multiple value n may be used to generate multiple segmented lesion candidates for each lesion center candidate. At step 508, an initial binary segmentation result is generating based on the threshold. In particular, all voxels having a lower intensity than the threshold are considered to be lesion tissue. FIG. 7 illustrates exemplary initial segmentation results using adaptive thresholding. As illustrated in FIG. 7, images 700 show various views of segmented liver region in a CT image, images 702 show initial binary segmentation results using a threshold of 1.5 times the standard deviation, and images 704 show initial binary segmentation results using a threshold of 3 times the standard deviation.

Figure 8:
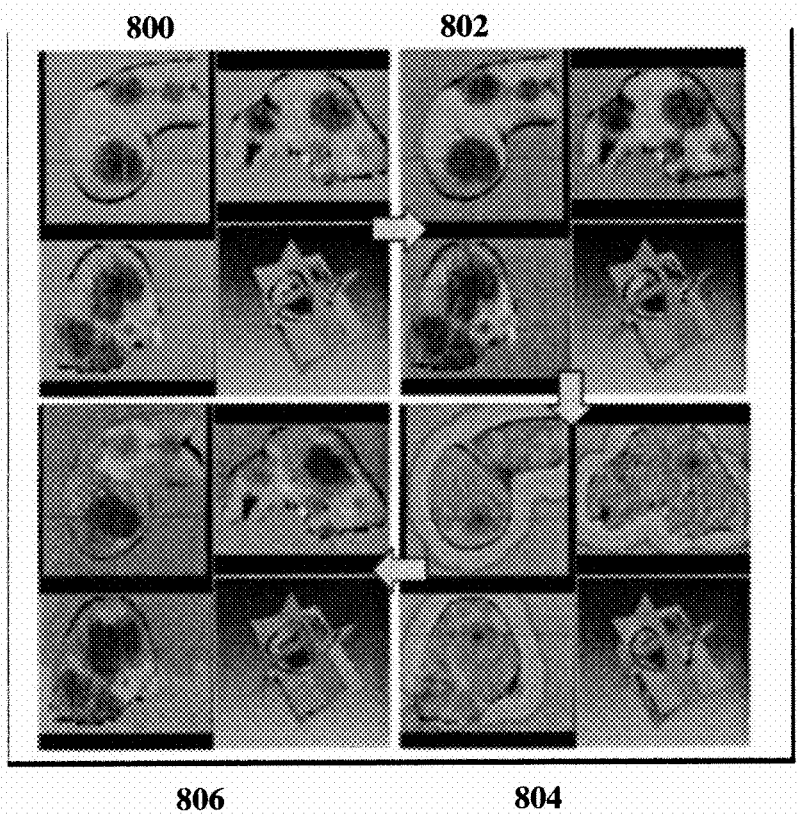
FIG. 8 shows exemplary results of adaptive thresholding watershed identification (ATWI)

At step 510 a distance transform of the initial binary segmentation result is generated. The distance transform distinguishes between neighboring lesions that can be segmented into the same object in the initial binary segmentation, and assigns neighboring lesions distinct ID numbers. The distance transform distinguishes between neighboring lesions by calculating the distance from each lesion point in the initial binary segmentation to the nearest non-lesion point. At step 512, a watershed transform is applied to determine artificial boundaries between the neighboring lesion candidates. This results in a segmented lesion candidate corresponding to each ID number and corresponding to each lesion center candidate. FIG. 8 shows exemplary results of adaptive thresholding watershed identification (ATWI). As illustrated in FIG. 8, images 800 show various views of segmented liver region in a CT image, images 802 show initial binary segmentation results obtained using adaptive thresholding, images 804 show a distance transform applied to the initial binary segmentation results 802, and images 806 show a watershed transform applied to determine boundaries between neighboring lesions.

In the adaptive thresholding, it is possible to use multiple thresholds instead of a single one. For example, thresholds of 1.5, 2, 2.5, and 3 times the standard deviation to can be used to obtain different thresholds. The ATWI procedure will then yield multiple segmentations corresponding to each candidate lesion. During training for the learning base verification, for each lesion we will use the segmentation that matches the annotated ground truth bounding box. During detection (i.e., candidate verification), each segmentation candidate will be assigned a score and the highest scored candidate is selected.

Adaptive segmentation using a single based on intensity histograms of the segmented liver are is subject to the following constraints. First, the threshold value is determined heuristically which is not necessarily optimal. The segmentation result can be very sensitive to the threshold and a slight difference of its value may cause a drastically different segmentation result. Second, multiple lesions within the same liver can have different intensities and a single threshold may not be able to segment all of them well. Accordingly, a gradient-based locally adaptive segmentation (GBLAS) method may be used to address the above described issues. The GBLAS method starts with an adaptive thresholding segmentation result and locally fine-tunes the threshold value to generate segmented candidates with strong gradients along their boundaries.

Figure 9A:
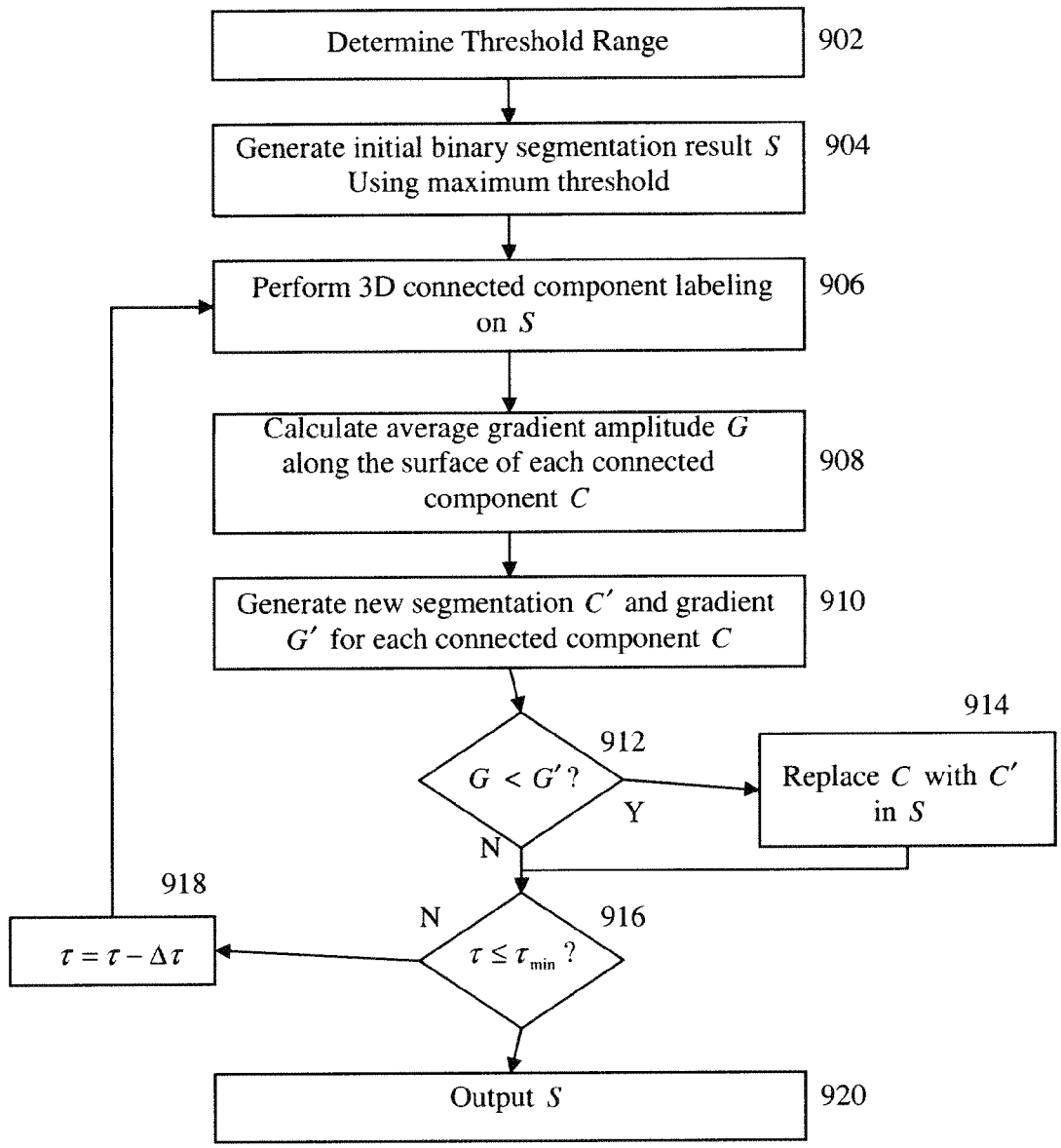
FIG. 9A illustrates a method for segmenting lesion candidates using gradient-based locally adaptive segmentation (GBLAS) according to another embodiment of the present invention.

FIG. 9A illustrates a method for segmenting lesion candidates using gradient-based locally adaptive segmentation (GBLAS) according to another embodiment of the present invention. FIG. 9B illustrates pseudo-code for implementing the method of FIG. 9A. The method of FIGS. 9A and 9B may be used to implement step 108 of FIG. 1. As illustrated in FIG. 9A, at step 902, a threshold range is determined. This is shown at 952 of FIG. 9B. In one possible implementation, the liver intensity profile analysis described above and shown FIG. 6, is used to obtain an initial threshold $T_0$, and a threshold range $[T_{min}, T_{max}]$ is defined as $[T_0-10, T_0+10]$. In another possible implementation (shown in FIG. 9B), The algorithm is as given below $T_{min}$ js set as $[\tau_{peak}-n\sigma, \tau_{peak}]$, where $\tau_{peak}$ is the peak intensity of the histogram.

At step 904, an initial binary segmentation result S is generated using the maximum threshold $T_{max}$ as the threshold $\tau$ for the entire image. This is shown at 954 of FIG. 9B. In this case the voxels having intensities below $\tau$ will be set as 1 and voxels having intensities above $\tau$ will be set as zero. At step 906, 3D connected component labeling is performed on the segmentation result S. This is shown at 956 of FIG. 9B.

At step 908, for each connected component C the average image gradient amplitude G is calculated along the surface of the connected component C. This is shown at 958 of FIG. 9B. At step 910, for each connected component C, a new segmentation C' is generated using a lower threshold $\tau-\Delta\tau$ and a the average gradient G' on the surface of C' is calculated. This is shown at 960 of FIG. 9B. It is possible that the connected component C could disappear with the lower threshold. In this case, G' is set to be zero.

At step 912, it is determined whether G<G' for each connected component C. If G<G' for a connected component C, the method proceeds to step 914, and at step 914, the connected component C is replaced with C' in the segmentation result S. If G≥G' at step 912, the connected component C is preserved in S, and the method proceeds to step 916. This is shown at 962 of FIG. 9B.

At step 916, it is determined if $\tau \leq \tau_{min}$. If $\tau$ is not less than or equal to $\tau_{min}$, the method proceeds to step 918, and at step 918 the threshold is incremented as $\tau=\tau-\Delta\tau$ and the method returns to step 906. If $\tau \leq \tau_{min}$ at step 916, the method proceeds to step 920. At step 920, the segmentation result S is output. This segmentation result may contain various connected components that were segmented locally at different threshold. Steps 916-920 of FIG. 9A are shown at 964 of FIG. 9B.

FIG. 10 illustrates exemplary segmentation using two neighboring thresholds. As illustrated in FIG. 10 image 1000 shows connected components C1, C2, and C3 segmented at a threshold $\tau$ and image 1002 shows the same regions segmented at a threshold $\tau-\Delta\tau$. As shown in FIG. 10, when a lower threshold is used, the original segmentation will always be larger than or equal to the new segmentation. The following situations can occur. As illustrated by component C1 of FIG. 10, a component can break into multiple smaller components. In this case, the new gradient amplitude G' is calculated by averaging the gradient amplitudes of all of the separate components inside the original component. As illustrated by component C2 of FIG. 10, a component can shrink to a smaller component. As illustrated by component C3 of FIG. 10, a component can disappear. In this case, the original segmentation is kept as the segmentation result for this component.

Figure 11:
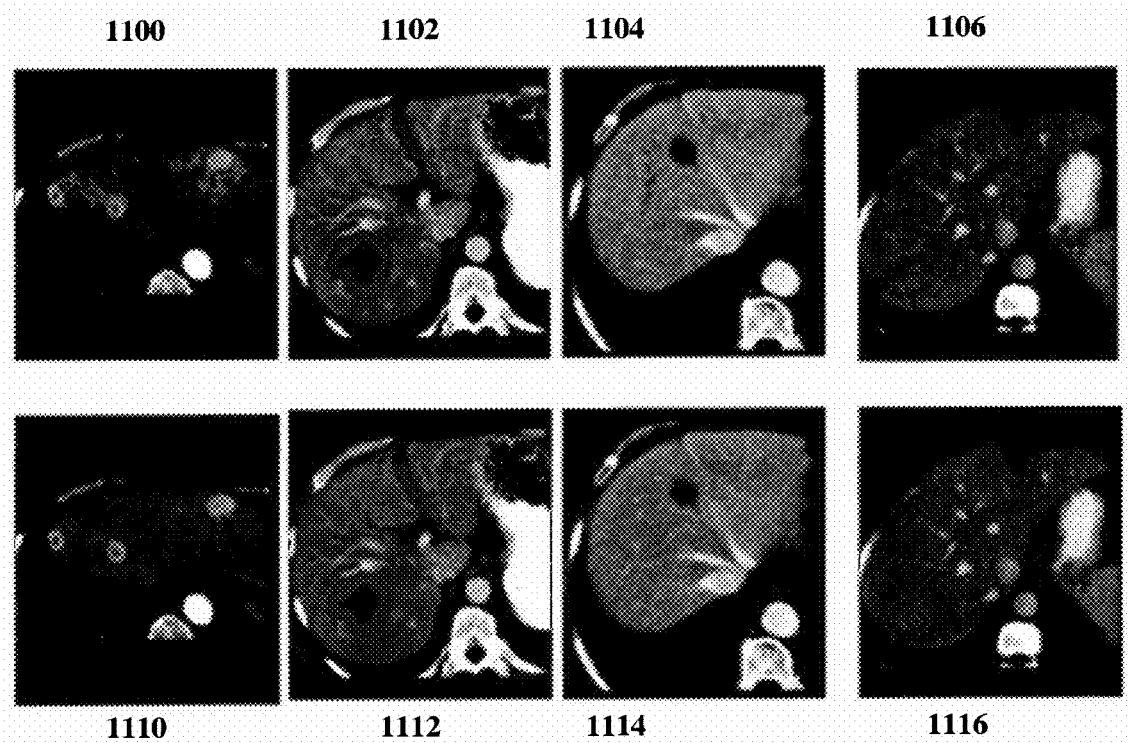
FIG. 11 illustrates exemplary liver lesion segmentation results using gradient based locally adaptive segmentation (GBLAS)
Figure 12:
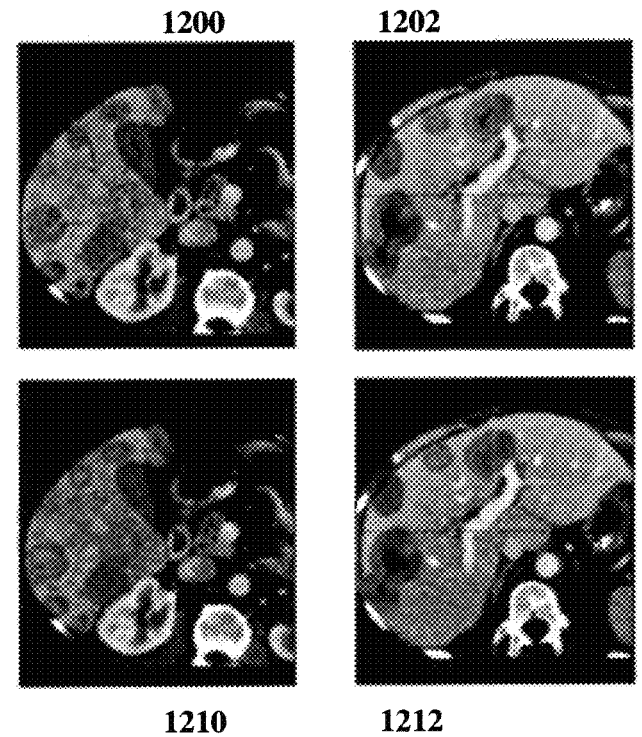
FIG. 12 illustrates exemplary segmentation results using gradient based locally adaptive segmentation (GBLAS) for lesions with inhomogenous intensities inside a liver.

FIG. 11 illustrates exemplary liver lesion segmentation results using gradient based locally adaptive segmentation (GBLAS). As illustrated in FIG. 11, images 1100, 1102, 1104, and 1106 show liver lesion segmentation results using single threshold adaptive thresholding and images 1110, 1112, 1114, and 1116 show liver lesion segmentation results using the GBLAS method of FIGS. 9A and 9B. FIG. 12 illustrates exemplary segmentation results using gradient based locally adaptive segmentation (GBLAS) for lesions with inhomogenous intensities inside a liver. As illustrated in FIG. 12, images 1200 and 1201 show liver lesion segmentation results using single threshold adaptive thresholding and images 1210 and 1212 show liver lesion segmentation results using the GBLAS method of FIGS. 9A and 9B.

Returning to FIG. 1, at step 110, lesions are detected from the segmented lesion candidates using learning based verification. In particular, various features are extracted for each segmented lesion candidate, and a trained verification detector calculates a detection score based on the extracted features. Lesion candidates having detection scores above a threshold are determined to be liver lesions.

Figure 13:
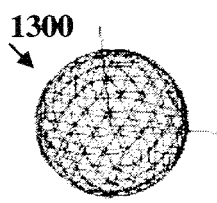
FIG. 13 illustrates an exemplary triangulation of a sphere representing a segmented lesion candidate.

The segmentation is used to derive more informative features for verification of the liver lesion candidates. In one possible implementation, steerable features are extracted on the boundary obtained with ATWI for each lesion candidate. Since there is no natural ordering of the points on the boundary, the boundary can be triangularized with 162 vertices, 480 edges, and 320 triangles. FIG. 13 illustrates an exemplary triangulation of a sphere representing a segmented lesion candidate. The features obtained on the vertices are then sorted by their values. This guarantees that the features are invariant to permutation, including rotation, and hence less prone to overfitting the training data.

In another possible implementation features describing the "blobness" and "vesselness" of the segmented candidate regions can be used in addition to the steerable features. Lesions have a blob-like shape, whereas confusing objects, such as dark vessels, have an elongated shape. In order to enhance the classification performance by distinguishing such different shapes, the blobness and vesselness features described in Frangi et al., "Multiscale Vessel Enhancement Filtering", Vol. 1496/1998, 130, MICCAI 1998, which is incorporated herein by reference.

Figure 14:
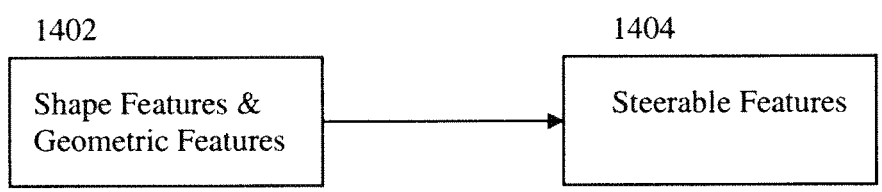
FIG. 14 illustrates a structure of a learning based lesion candidate verification detector according to an embodiment of the present invention.

FIG. 14 illustrates a structure of a learning based lesion candidate verification detector according to an embodiment of the present invention. As illustrated in FIG. 14, the lesion candidate verification detector includes two coarse-to-fine detectors 1402 and 1404. The first detector 1402 calculates a detection score for each segmented lesion candidate based on shape features and geometric features extracted from each lesion candidate. Lesion candidates having a detection score from the first detector 1402 over a certain threshold are propagated to the second detector 1404. In one implementation, the first detector 1402 calculates 28 geometric features and 6 statistical features of each connected component obtained in the segmentation. The geometric features include features such as diameter, volume size, surface area, compactness, rectangularity, elongation, and central moments. The statistical features comprise min, max, mean, variance, skewness, and kurtosis of intensities. Because some structures in the liver show similar intensities to the lesions, for instance, vessels and hyperdense lesions are both enhanced in the arterial phase, many segmented objects are not lesions. Therefore, these shape and statistical descriptors are used to identify and reject obvious non-lesion segmentations.

The second lesion candidate verification detector 1404 uses many dense steerable features calculated from each segmented lesion candidate to further remove difficult false positives. The features are calculated by casting rays in 162 directions in 3D space from each candidate, as shown in the triangulation of FIG. 13. In each direction, the following features are calculated at the boundary of each segmented lesion candidate:

Intensity based features: Assume the intensity and gradient at boundary (x, y, z) is I and $g=(g_x, g_y, g_z)$, respectively. For each of the 162 directions, 24 feature types are calculated, including I, $\sqrt{I}$, $I^2$, $I^3$, log I, $g_x$, $g_x$, $g_z$, $\|g\|$, $\sqrt{\|g\|}$, $\|g\|^2$, $\|g\|^3$, log $\|g\|$. The 162 values for each feature type are sorted by value. This not only ensures rotational invariance, but also invariance to all permutations, including mirroring. Additionally, for each of the 24 feature types, the 81 sums of feature values at the pairs of opposite vertices on the triangulation are calculated and sorted by value.

Geometry features: The 81 diameters (distances between opposite vertices relative to the segmentation center) are sorted. For each diameter the following features are calculated: (a) The value of each diameter; (b) Asymmetry of each diameter, i.e. the ratio of the larger radius over the smaller radius; (c) The ratio of the i-th sorted diameter and the j-th diameter for all 1_i<j_81; (d) For each of the 24 feature types, the maximum or minimum of the feature values at the two diameter ends; and (e) For each of the 24 feature types, the maximum or minimum of the feature values half way to the diameter ends.

In total there are about 17,000 features in the above described embodiment. Using these features, a cascade of two PBT classifiers with 70 and 140 weak learners, respectively, can be trained. Because multiple candidates can be detected in a single lesion, all the remaining candidates at the final stage are clustered using non-maximal suppression. To accommodate lesions of vastly different sizes, the above described methods may repeated with different resolutions in a pyramid manner.

Returning to FIG. 1, at step 112, the lesion detection results are output. For example, the lesion detection results can be output by displaying the detected lesions on a display device of a computer system or be storing the lesion detection results on a memory or storage of a computer system.

Figure 15:
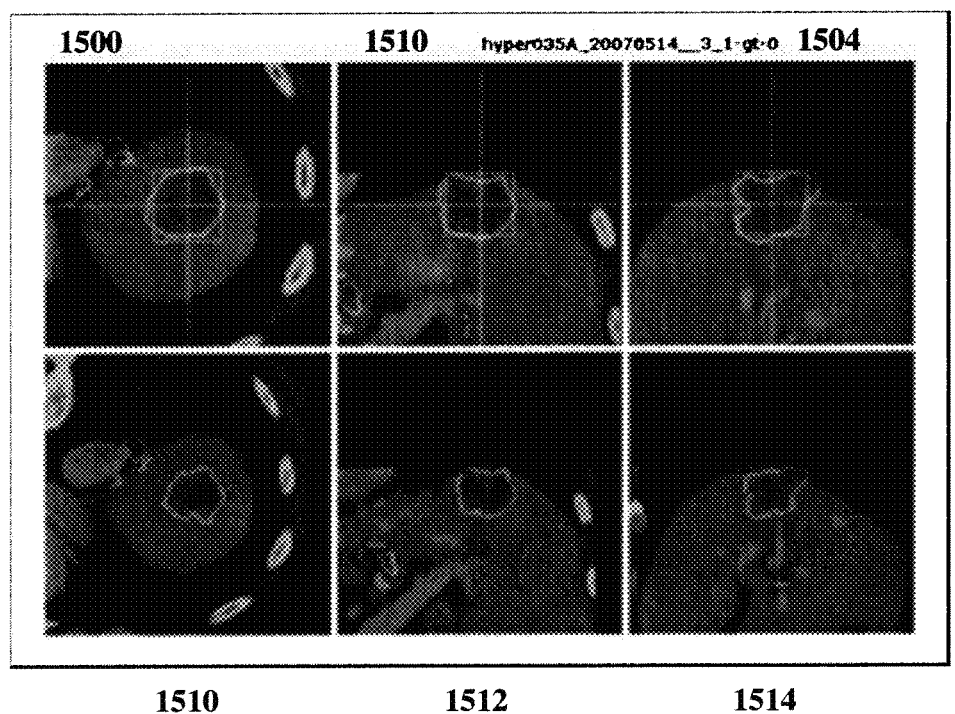
FIGS. 15 and 16 illustrate exemplary lesion detection results.
Figure 16:
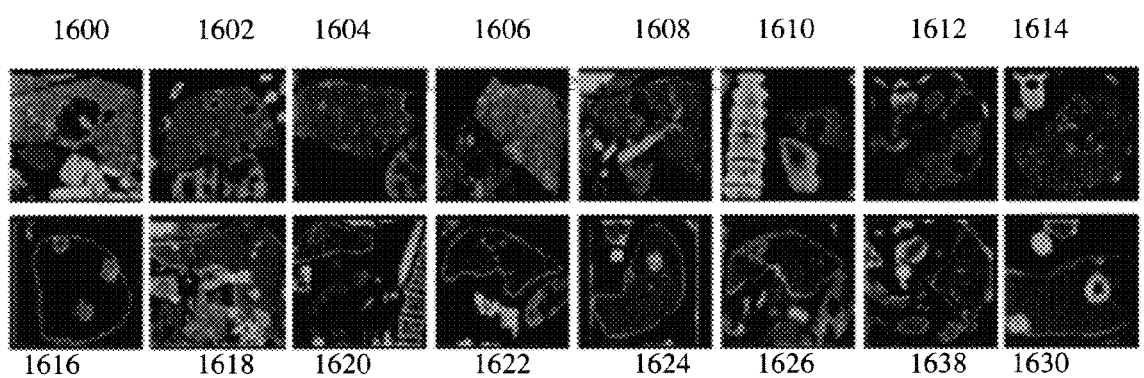

FIGS. 15 and 16 illustrate exemplary lesion detection results. As illustrated in FIG. 15, images 1500, 1502, and 1504 show ground truth annotated liver lesions, and images 1510, 1512, and 1514 show lesion detection results corresponding to the lesions of image 1500, 1502, and 1504, respectively. As illustrated in FIG. 16, images 1600-1614 show detection results for hypodense lesions and images 1616-1630 show detection results for hyperdense lesions.

The above described methods for liver lesion detection can also be extended to exploit data from multiple modalities (e.g. PET/CT). In hybrid scanners, such as PET/CT, the PET image data reflects functional properties of tissues such as tumor metabolism. Tissues with high metabolism such as tumors typically appear as high-intensity regions ("bright hot spots") in the PET images. Since both modalities are acquired within the same imaging system without displacing the patient, the resulting image data is spatially well-aligned. Similar to the CT data, the Haar-like features and Blobness and Vesselness can also be used on the PET data and such features can be fed into one common feature pool. The lesion segmentation approaches described above may also be applied to PET data.

Figure 17:
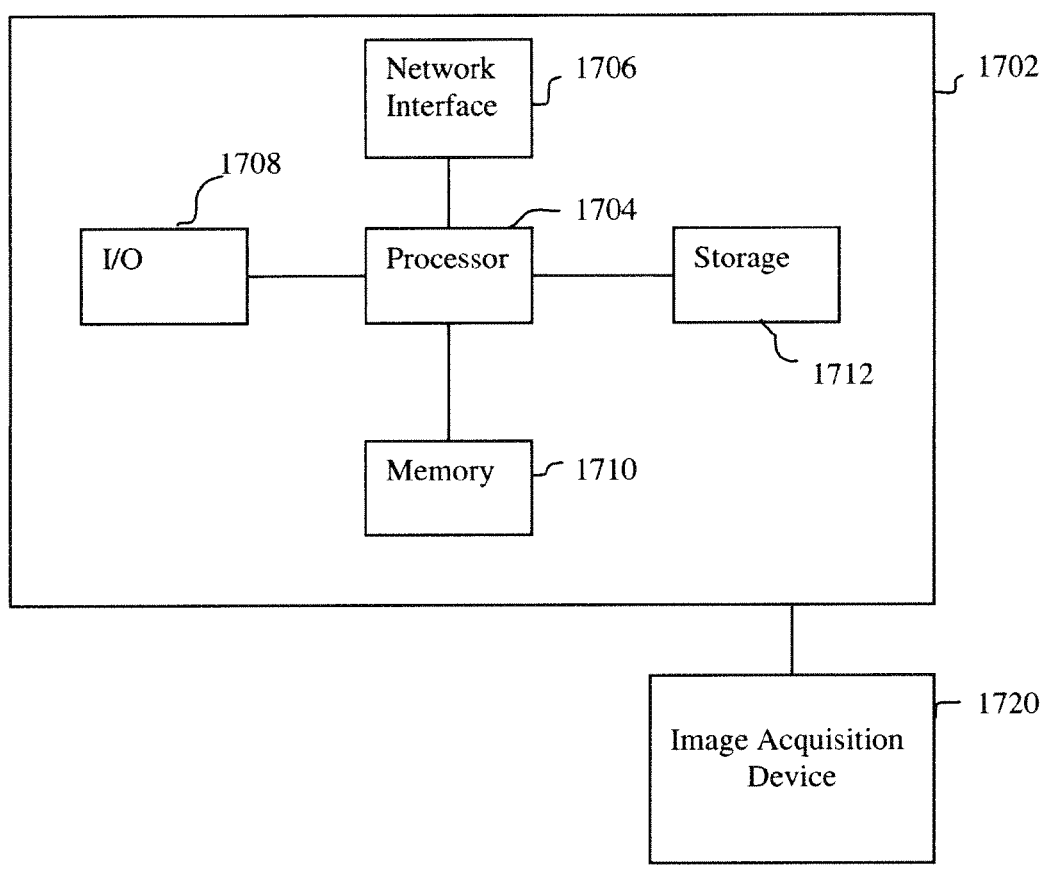
FIG. 17 is a high level block diagram of a computer capable of implementing the present invention.

The above-described methods for automatic detection and segmentation of liver lesions in medical image data may be implemented on a computer using well-known computer processors, memory units, storage devices, computer software, and other components. A high level block diagram of such a computer is illustrated in FIG. 17. Computer 1702 contains a processor 1704 which controls the overall operation of the computer 1702 by executing computer program instructions which define such operation. The computer program instructions may be stored in a storage device 1712, or other computer readable medium (e.g., magnetic disk, CD ROM, etc.) and loaded into memory 1710 when execution of the computer program instructions is desired. Thus, the detection stages of FIG. 1 and the method steps of FIGS. 2 and 6 may be defined by the computer program instructions stored in the memory 1710 and/or storage 1712 and controlled by the processor 1704 executing the computer program instructions. An image acquisition device 1720, such as an x-ray acquisition device, can be connected to the computer 1702 to input MRI images to the computer 1702. It is possible to implement the image acquisition device 1720 and the computer 1702 as one device. It is also possible that the image acquisition device 1720 and the computer 1702 communicate wirelessly through a network. The computer 1702 also includes one or more network interfaces 1706 for communicating with other devices via a network. The computer 1702 also includes other input/output devices 1708 that enable user interaction with the computer 1702 (e.g., display, keyboard, mouse, speakers, buttons, etc.). One skilled in the art will recognize that an implementation of an actual computer could contain other components as well, and that FIG. 17 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting liver lesions in a 3D medical image comprising:
   detecting liver lesion center candidates in the 3D medical image using one or more trained lesion center detectors trained based on annotated training data;
   segmenting a lesion candidate corresponding to each liver lesion center candidate; and
   detecting lesions from the segmented lesion candidates using learning based verification, wherein the step of detecting lesions from the segmented lesion candidates using learning based verification comprises:
   detecting a subset of the segmented lesion candidates using a first trained detector based on geometric and statistical features extracted from a connected component corresponding to each segmented lesion candidate; and
   detecting the lesions from the first subset of segmented lesion candidates using a second trained detector based on steerable intensity and geometry features extracted from a triangulated model corresponding to each of the subset of segmented lesion candidates.

2. The method of claim 1, further comprising segmenting a liver region in the 3D medical image, wherein the step of detecting liver lesion center candidates in the 3D medical image comprises:

constraining a search for the liver lesion center candidates to the segmented liver region.

3. The method of claim 1, wherein the step of detecting liver lesion center candidates in the 3D medical image comprises:
   detecting a first set of liver lesion center candidates based on Haar features extracted from the 3D medical image data using a first trained center candidate detector;
   detecting a second set of liver lesion center candidates by pruning the first set of liver lesion center candidates based on Haar features using a second trained center candidate detector trained using false positives from the first trained center candidate detector.

4. The method of claim 3, wherein the step of detecting liver lesion center candidates further comprises;
   detecting a third set of liver lesion center candidates from the second set of liver lesion center candidates based on steerable features extracted for each of the second set of liver lesion center candidates using a third trained center candidate detector.

5. The method of claim 1, further comprising:
   inverting intensities in a liver region prior to the step of detecting liver lesion center candidates.

6. The method of claim 1, further comprising detecting a contrast phase of the 3D image, wherein the step of detecting liver lesion center candidates comprises:
   detecting the liver lesion center candidates based on the detected contrast phase.

7. The method of claim 6, wherein the step of detecting the liver lesion center candidates based on the detected contrast phase comprises:
   detecting the liver lesion center candidates using a liver lesion center candidate detector trained for the detected contrast phase.

8. The method of claim 6, wherein the step of detecting the liver lesion center candidates based on the detected contrast phase comprises:
   when the detected contrast phase is an arterial phase,
      inverting intensities in a liver region of the 3D medical image, and
      detecting hyperdense lesions using a trained detector; and
   when the detected contrast phase is a portal venous phase, detecting hypodense lesions using a trained detector.

9. The method of claim 1, wherein the step of segmenting a lesion candidate corresponding to each liver lesion center candidate comprises:
   generating a binary segmentation of a liver region using adaptive thresholding;
   generating a distance transform of the binary segmentation to distinguish between neighboring lesion candidates in the binary segmentation; and
   applying a watershed transform to determine artificial boundaries between the neighboring lesion candidates.

10. The method of claim 1, wherein the step of segmenting a lesion candidate corresponding to each liver lesion center candidate comprises:
   segmenting a plurality of lesion candidates for each one of the detected liver lesion center candidates using multiple iterations of adaptive thresholding with different thresholds.

11. The method of claim 1, wherein the segmenting a lesion candidate corresponding to each liver lesion center candidate comprises:
   (a) determining an intensity threshold range based on an intensity distribution of a liver region in the 3D image;
   (b) generating a binary segmentation using a maximum threshold of the intensity threshold range;
   (c) generating one or more connected components using connected component labeling on the binary segmentation;
   (d) for each connected component:
      calculating the average gradient along a surface of the connected component,
      segmenting a new connected component at a lower threshold and calculating the average gradient along a surface of the new connected component, and
      when the average gradient along the surface of the connected component is less than the average gradient along the surface of the new component, replacing the connected component with the new connected component in the binary segmentation.

12. The method of claim 1, wherein the step of detecting the lesions from the subset of segmented lesion candidates using a second trained detector based on steerable intensity and geometry features extracted from a triangulated model corresponding to each of the subset of segmented lesion candidates comprises:
   extracting the steerable intensity and geometry features from the triangulated model corresponding to each of the subset of segmented lesion candidates;
   determining a detection score for each of the subset of segmented lesion candidates based on the extracted steerable intensity and geometry features using a trained detector; and
   detecting each of the subset of segmented lesion candidates having a detection score greater than a threshold to be a lesion.

13. The method of claim 12, wherein the step of extracting the steerable intensity and geometry features from the triangulated model corresponding to each of the subset of segmented lesion candidates comprises:
   triangulating a boundary of each segmented lesion candidate with a plurality of vertices, a plurality of edges, and a plurality of triangles; and
   extracting the steerable intensity and geometry features at each of the vertices of the triangulated boundary.

14. An apparatus for detecting liver lesions in a 3D medical image comprising:
   means for detecting liver lesion center candidates in the 3D medical image using one or more trained lesion center detectors trained based on annotated training data;
   means for segmenting a lesion candidate corresponding to each liver lesion center candidate; and
   means for detecting lesions from the segmented lesion candidates using learning based verification, wherein the means for detecting lesions from the segmented lesion candidates using learning based verification comprises:
   means for detecting a subset of the segmented lesion candidates using a first trained detector based on geometric and statistical features extracted from a connected component corresponding to each segmented lesion candidate; and
   means for detecting the lesions from the first subset of segmented lesion candidates using a second trained detector based on steerable intensity and geometry features extracted from a triangulated model corresponding to each of the subset of segmented lesion candidates.

15. The apparatus of claim 14, further comprising means for segmenting a liver region in the 3D medical image, wherein the means for detecting liver lesion center candidates in the 3D medical image comprises:

means for constraining a search for the liver lesion center candidates to the segmented liver region.

16. The apparatus of claim 14, wherein the means for detecting liver lesion center candidates in the 3D medical image comprises:
means for detecting a first set of liver lesion center candidates based on Haar features extracted from the 3D medical image data using a first trained center candidate detector;
means for detecting a second set of liver lesion center candidates by pruning the first set of liver lesion center candidates based on Haar features using a second trained center candidate detector trained using false positives from the first trained center candidate detector.

17. The apparatus of claim 16, wherein the means for detecting liver lesion center candidates further comprises;
means for detecting a third set of liver lesion center candidates from the second set of liver lesion center candidates based on steerable features extracted for each of the second set of liver lesion center candidates using a third trained center candidate detector.

18. The apparatus of claim 14, further comprising:
means for inverting intensities in a liver region of the 3D image.

19. The apparatus of claim 14, wherein the means for segmenting a lesion candidate corresponding to each liver lesion center candidate comprises:
means for generating a binary segmentation of a liver region using adaptive thresholding;
means for generating a distance transform of the binary segmentation to distinguish between neighboring lesion candidates in the binary segmentation; and
means for applying a watershed transform to determine artificial boundaries between the neighboring lesion candidates.

20. The apparatus of claim 14, wherein the means for segmenting a lesion candidate corresponding to each liver lesion center candidate comprises:
means for segmenting a plurality of lesion candidates for each one of the detected liver lesion center candidates using multiple iterations of adaptive thresholding with different thresholds.

21. The apparatus of claim 14, wherein the means for segmenting a lesion candidate corresponding to each liver lesion center candidate comprises:
means for determining an intensity threshold range based on an intensity distribution of a liver region in the 3D image;
means for generating a binary segmentation using a maximum threshold of the intensity threshold range;
means for generating one or more connected components using connected component labeling on the binary segmentation;
means for calculating the average gradient along a surface of each connected component,
means for segmenting a new connected component at a lower threshold and calculating the average gradient along a surface of the new connected component for each connected component, and
means for replacing a connected component with the new connected component in the binary segmentation when the average gradient along the surface of the connected component is less than the average gradient along the surface of the new component.

22. The apparatus of claim 14, wherein the means for detecting the lesions from the subset of segmented lesion candidates using a second trained detector based on steerable intensity and geometry features extracted from a triangulated model corresponding to each of the subset of segmented lesion candidates comprises:
means for extracting the steerable intensity and geometry features from the triangulated model corresponding to each of the subset of segmented lesion candidates;
means for determining a detection score for each of the subset of segmented lesion candidates based on the extracted steerable intensity and geometry features using a trained detector; and
means for detecting each of the subset of segmented lesion candidates having a detection score greater than a threshold to be a lesion.

23. A non-transitory computer readable medium encoded with computer executable instructions for detecting liver lesions in a 3D medical image, the computer executable instructions defining steps comprising:
detecting liver lesion center candidates in the 3D medical image using one or more trained lesion center detectors trained based on annotated training data;
segmenting a lesion candidate corresponding to each liver lesion center candidate; and
detecting lesions from the segmented lesion candidates using learning based verification, wherein the computer executable instructions defining the step of detecting lesions from the segmented lesion candidates using learning based verification comprise computer executable instructions defining the steps of:
detecting a subset of the segmented lesion candidates using a first trained detector based on geometric and statistical features extracted from a connected component corresponding to each segmented lesion candidate; and
detecting the lesions from the first subset of segmented lesion candidates using a second trained detector based on steerable intensity and geometry features extracted from a triangulated model corresponding to each of the subset of segmented lesion candidates.

24. The non-transitory computer readable medium of claim 23, further comprising computer executable instructions defining the step of segmenting a liver region in the 3D medical image, wherein the computer executable instructions defining the step of detecting liver lesion center candidates in the 3D medical image comprise computer executable instructions defining the step of:
constraining a search for the liver lesion center candidates to the segmented liver region.

25. The non-transitory computer readable medium of claim 23, wherein the computer executable instructions defining the step of detecting liver lesion center candidates in the 3D medical image comprise computer executable instructions defining the steps of:
detecting a first set of liver lesion center candidates based on Haar features extracted from the 3D medical image data using a first trained center candidate detector;
detecting a second set of liver lesion center candidates by pruning the first set of liver lesion center candidates based on Haar features using a second trained center candidate detector trained using false positives from the first trained center candidate detector.

26. The non-transitory computer readable medium of claim 25, wherein the computer executable instructions defining the step of detecting liver lesion center candidates further comprise computer executable instructions defining the step of;
detecting a third set of liver lesion center candidates from the second set of liver lesion center candidates based on steerable features extracted for each of the second set of liver lesion center candidates using a third trained center candidate detector.

27. The non-transitory computer readable medium of claim 23, further comprising computer executable instructions defining the step of:
inverting intensities in a liver region prior to the step of detecting liver lesion center candidates.

28. The non-transitory computer readable medium of claim 23, wherein the computer executable instructions defining the step of segmenting a lesion candidate corresponding to each liver lesion center candidate comprise computer executable instructions defining the steps of:
generating a binary segmentation of a liver region using adaptive thresholding;
generating a distance transform of the binary segmentation to distinguish between neighboring lesion candidates in the binary segmentation; and
applying a watershed transform to determine artificial boundaries between the neighboring lesion candidates.

29. The non-transitory computer readable medium of claim 23, wherein the computer executable instructions defining the step of segmenting a lesion candidate corresponding to each liver lesion center candidate comprise computer executable instructions defining the step of:
segmenting a plurality of lesion candidates for each one of the detected liver lesion center candidates using multiple iterations of adaptive thresholding with different thresholds.

30. The non-transitory computer readable medium of claim 23, wherein the computer executable instructions defining the step of segmenting a lesion candidate corresponding to each liver lesion center candidate comprise computer executable instructions defining the steps of:
(a) determining an intensity threshold range based on an intensity distribution of a liver region in the 3D image;
(b) generating a binary segmentation using a maximum threshold of the intensity threshold range;
(c) generating one or more connected components using connected component labeling on the binary segmentation;
(d) for each connected component:
calculating the average gradient along a surface of the connected component,
segmenting a new connected component at a lower threshold and calculating the average gradient along a surface of the new connected component, and
when the average gradient along the surface of the connected component is less than the average gradient along the surface of the new component, replacing the connected component with the new connected component in the binary segmentation.

31. The non-transitory computer readable medium of claim 23, wherein the computer executable instructions defining the step of detecting the lesions from the subset of segmented lesion candidates using a second trained detector based on steerable intensity and geometry features extracted from a triangulated model corresponding to each of the subset of segmented lesion candidates comprise computer executable instructions defining the steps of:
extracting the steerable intensity and geometry features from the triangulated model corresponding to each of the subset of segmented lesion candidates;
determining a detection score for each of the subset of segmented lesion candidates based on the extracted steerable intensity and geometry features using a trained detector; and
detecting each of the subset of segmented lesion candidates having a detection score greater than a threshold to be a lesion.

* * * * *